(12) United States Patent
Kida et al.

(10) Patent No.: US 8,976,171 B2
(45) Date of Patent: Mar. 10, 2015

(54) DEPTH ESTIMATION DATA GENERATING APPARATUS, DEPTH ESTIMATION DATA GENERATING METHOD, AND DEPTH ESTIMATION DATA GENERATING PROGRAM, AND PSEUDO THREE-DIMENSIONAL IMAGE GENERATING APPARATUS, PSEUDO THREE-DIMENSIONAL IMAGE GENERATING METHOD, AND PSEUDO THREE-DIMENSIONAL IMAGE GENERATING PROGRAM

(75) Inventors: Shingo Kida, Tokyo (JP); Kenji Kubota, Yokohama (JP)

(73) Assignee: JVC Kenwood Corporation (JP)

( * ) Notice: Subject to any disclaimer, the term of this patent is extended or adjusted under 35 U.S.C. 154(b) by 60 days.

(21) Appl. No.: 13/615,911

(22) Filed: Sep. 14, 2012

(65) Prior Publication Data

US 2013/0076745 A1 Mar. 28, 2013

(30) Foreign Application Priority Data

Sep. 22, 2011 (JP) ................................. 2011-206787

(51) Int. Cl.
*G06T 15/00* (2011.01)
*G06T 7/00* (2006.01)
*H04N 13/02* (2006.01)

(52) U.S. Cl.
CPC ............ *G06T 7/0051* (2013.01); *H04N 13/026* (2013.01)
USPC ........................................................ 345/419

(58) Field of Classification Search
CPC ................................ G06T 19/00; G06T 17/20
USPC ......................................................... 345/419
See application file for complete search history.

(56) References Cited

U.S. PATENT DOCUMENTS

| 7,262,767 | B2 * | 8/2007 | Yamada ......................... 345/419 |
| 2009/0022396 | A1 * | 1/2009 | Watanabe et al. .............. 382/167 |
| 2009/0041339 | A1 * | 2/2009 | Yamada et al. ................. 382/154 |
| 2011/0080400 | A1 * | 4/2011 | Yamada ......................... 345/419 |
| 2011/0090216 | A1 * | 4/2011 | Yamada et al. ................ 345/419 |
| 2011/0273531 | A1 * | 11/2011 | Ito et al. ........................... 348/43 |

FOREIGN PATENT DOCUMENTS

JP 2005151534 6/2005

OTHER PUBLICATIONS

K. Yamada, et al., Disocclusion Based on the Texture Statistics of the Image Segmented by the Region Competition Algorithm, The Journal of the Institute of Image Information and Television Engineer, vol. 56, No. 5, 2002, p. 863-866.

* cited by examiner

*Primary Examiner* — Javid A Amini
*Assistant Examiner* — Jin Ge
(74) *Attorney, Agent, or Firm* — Cantor Colburn LLP

(57) ABSTRACT

An RB rate calculator calculates an RB rate based on an R signal and a B signal. A starting point changing unit changes a starting point based on the RB rate. An offset calculating unit calculates an offset value to adjust for selection of a basic depth model type based on a bottom high frequency component evaluation value. An adding unit adds a signal from the starting point changing unit and an offset. Another adding unit adds an offset-added signal from the adding unit and a basic depth model-composed image signal supplied from a composing unit, and generates depth estimation data wherein a degree of superimposition of object information is changed according to a composition of a composed image of basic depth models selected to be composed.

8 Claims, 13 Drawing Sheets though the image overall has some form of depth, but the sense of separation between the background and the object is not sufficient. Even the pseudo 3D image generating device may use an R signal, a B signal, or both as object information, the scene structure close to reality is not reflected, and the basic depth model images are simply overlaid.

DEPTH ESTIMATION DATA GENERATING APPARATUS, DEPTH ESTIMATION DATA GENERATING METHOD, AND DEPTH ESTIMATION DATA GENERATING PROGRAM, AND PSEUDO THREE-DIMENSIONAL IMAGE GENERATING APPARATUS, PSEUDO THREE-DIMENSIONAL IMAGE GENERATING METHOD, AND PSEUDO THREE-DIMENSIONAL IMAGE GENERATING PROGRAM

CROSS-REFERENCE TO RELATED PATENT APPLICATIONS

This application claims the benefit of Japanese Patent Application No. 2011-206787, filed on Sep. 22, 2011, in the Japan Patent Office, the disclosure of which is incorporated herein in its entirety by reference.

BACKGROUND OF THE INVENTION

1. Field of the Invention

The present invention relates to a depth estimation data generating apparatus, depth estimation data generating method, and depth estimation data generating program, and a pseudo three-dimensional (3D) image generating apparatus, pseudo 3D image generating method, and pseudo 3D image generating program, and more particularly, to a depth estimation data generating apparatus, depth estimation data generating method, and depth estimation data generating program, which generate depth estimation data from an image (non-3D image) to which depth information is neither explicitly included nor implicitly included like a stereo image, and an pseudo 3D image generating apparatus, pseudo 3D image generating method, and pseudo 3D image generating program, which perform a process on the non-3D image based on the depth estimation data to generate and output a non-3D image having a different viewpoint for a 3D effect.

2. Description of the Related Art

In order to view a non-three-dimensional (3D) image in pseudo stereovision, a 3D display system generates a pseudo 3D image from general still images or a plurality of continuous images in time series forming a moving image, i.e., from an image (non-3D image) to which depth information for a 3D effect is neither included explicitly nor included implicitly like a stereo image.

An example of such a technology includes a pseudo 3D image generating device disclosed in Patent Document 1. In order to determine a scene structure close to reality as much as possible, the pseudo 3D image generating device of Patent Document 1 determines a composition ratio according to high frequency component estimation values of a non-3D image input from an upper screen high frequency component estimation unit and a lower screen high frequency component estimation unit, by using images of a plurality of types of basic depth models indicating depth values respectively for a plurality basic types of scene structures, and the images of the plurality of types of basic depth models are composed according to the composition ratio. Then, the composed images of the basic depth models and a red signal (R signal), of the non-3D image are superimposed to generate final depth estimation data. Also, by processing an image signal of the non-3D image based on the depth estimation data, an image signal of a different viewpoint image for a 3D effect is generated.

The pseudo 3D image generating device of Patent Document 1 generates the final depth estimation data by composing the images of the plurality of types of basic depth models according to the composition ratio determined according to the high frequency component evaluation values of the input non-3D image, and superimposing the R signal of the input non-3D image on the composed images of the basic depth models, as object information constituting information about concavity and convexity. Also, Patent Document 1 discloses that a blue signal (B signal) or a signal using both the R signal and B signal of the non-3D image may be used as the object information superimposed on the composed images of the basic depth model.

However, in the pseudo 3D image generating device of Patent Document 1, the images of the basic depth models are selected by analyzing a scene structure of the non-3D image. In this regard, the object information does not reflect a scene analysis of the non-3D image in any case of using the R signal, the B signal, or both the R and B signals. Also, since the pseudo 3D image generating device of Patent Document 1 simply adds the object information to the selected images of the basic depth model, a sense of separation between a background 121 and an object (such as a person) 122 is low, as shown in FIG. 12A.

[Patent Document 1] Japanese Laid-Open Patent Publication No. 2005-151534

SUMMARY OF THE INVENTION

The present invention provides a depth estimation data generating apparatus, depth estimation data generating method, and depth estimation data generating program, and a pseudo three-dimensional (3D) image generating apparatus, pseudo 3D image generating method, and pseudo 3D image generating program, which increase a 3D effect by improving a sense of separation between a background and an object.

According to an aspect of the present invention, there is provided a depth estimation data generating apparatus including: a generating unit which generates images of a plurality of basic depth models respectively indicating depth values of a plurality of basic scene structures; a first calculating unit which calculates a composition ratio between the images of the plurality of basic depth models by using statistics of at least some pixel values in a predetermined region in a screen of a non-3D image, so as to estimate a scene structure of the non-3D image to which depth information is neither included explicitly nor included implicitly like a stereo image; a composing unit which composes the images of the plurality of basic depth models generated by the generating unit according to the composition ratio and generates a basic depth model-composed image; an object signal generating unit which generates an object signal indicating object information about concavity and convexity of a pseudo 3D image from the non-3D image; a second calculating unit which calculates an offset value for emphasizing the object information about the concavity and convexity indicated by the object signal, by using the statistics of at least some of the pixel values in the predetermined region in the screen of the non-3D image; a compensating unit which compensates for the object signal based on the offset value; and an adding unit which adds the object signal compensated for by the compensating unit to the basic depth model-composed image composed by the composing unit to generate depth estimation data for generating an image having a viewpoint different from the non-3D image, the image constituting a pseudo 3D image with the non-3D image.

The second calculating unit may calculate an offset value emphasizing depth when the first calculating unit calculates an image of a basic depth model close to a plane model from among the images of the plurality of basic depth models at a higher composition ratio than those of images of other basic depth models, and calculate an offset value emphasizing extrusion when the first calculating unit calculates an image of a basic depth model close to a recess surface model from among the images of the plurality of basic depth models at a higher composition ratio than those of images of other basic depth models.

The object signal generating unit may include: a ratio calculating unit which calculates a signal ratio of a red signal and a blue signal constituting an image signal of the non-3D image in pixel units; and a starting point changing unit which outputs a value obtained by changing a center of the signal ratio calculated by the ratio calculating unit to a 0 starting point, as the object signal.

According to another aspect of the present invention, there is provided a depth estimation data generating method including: calculating a composition ratio between images of a plurality of basic depth models respectively indicating depth values of a plurality of basic scene structures, by using statistics of at least some pixel values in a predetermined region in a screen of a non-3D image, so as to estimate a scene structure of the non-3D image to which depth information is neither included explicitly nor included implicitly like a stereo image; generating a basic depth model-composed image by composing the images of the plurality of basic depth models according to the composition ratio; generating an object signal indicating object information about concavity and convexity of a pseudo 3D image from the non-3D image; calculating an offset value for emphasizing the object information about the concavity and convexity indicated by the object signal, by using the statistics of at least some of the pixel values in the predetermined region in the screen of the non-3D image; compensating for the object signal based on the offset value; and adding the object signal compensated for during the compensating to the basic depth model-composed image composed during the generating of the basic depth model-composed image to generate depth estimation data for generating an image having a different viewpoint from the non-3D image, the image constituting a pseudo 3D image with the non-3D image.

According to another aspect of the present invention, there is provided a depth estimation data generating program realized by a computer: calculating a composition ratio between images of a plurality of basic depth models respectively indicating depth values of a plurality of basic scene structures, by using statistics of at least some pixel values in a predetermined region in a screen of a non-3D image, so as to estimate a scene structure of the non-3D image to which depth information is neither included explicitly nor included implicitly like a stereo image; generating a basic depth model-composed image by composing the images of the plurality of basic depth models according to the composition ratio; generating an object signal indicating object information about concavity and convexity of a pseudo 3D image from the non-3D image; calculating an offset value for emphasizing the object information about the concavity and convexity indicated by the object signal, by using the statistics of at least some of the pixel values in the predetermined region in the screen of the non-3D image; compensating for the object signal based on the offset value; and adding the object signal compensated for during the compensating to the basic depth model-composed image composed during the generating of the basic depth model-composed image to generate depth estimation data for generating an image having a different viewpoint from the non-3D image, the image constituting a pseudo 3D image with the non-3D image.

According to another aspect of the present invention there is provided a pseudo 3D image generating apparatus including: a different viewpoint image generating unit which generates a different viewpoint image by shifting a texture of a non-3D image by an amount according to depth estimation data of a portion corresponding to the texture of the non-3D image, based on the depth estimation data generated by the above apparatus to which the non-3D image is supplied and the non-3D image to which depth information is neither included explicitly nor included implicitly like a stereo image; and an output unit which outputs a pseudo 3D image wherein one of the non-3D image and the different viewpoint image is a left-eye image and the other is a right-eye image.

According to another aspect of the present invention, there is provided a pseudo 3D image generating method including: generating a different viewpoint image by shifting a texture of a non-3D image by an amount according to depth estimation data of a portion corresponding to the texture of the non-3D image, based on the depth estimation data generated by the above method to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

According to another aspect of the present invention, there is provided a pseudo 3D image generating program which realizes in a computer: generating a different viewpoint image by shifting a texture of a non-3D image by an amount according to depth estimation data of a portion corresponding to the texture of the non-3D image, based on the depth estimation data generated by the above method to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
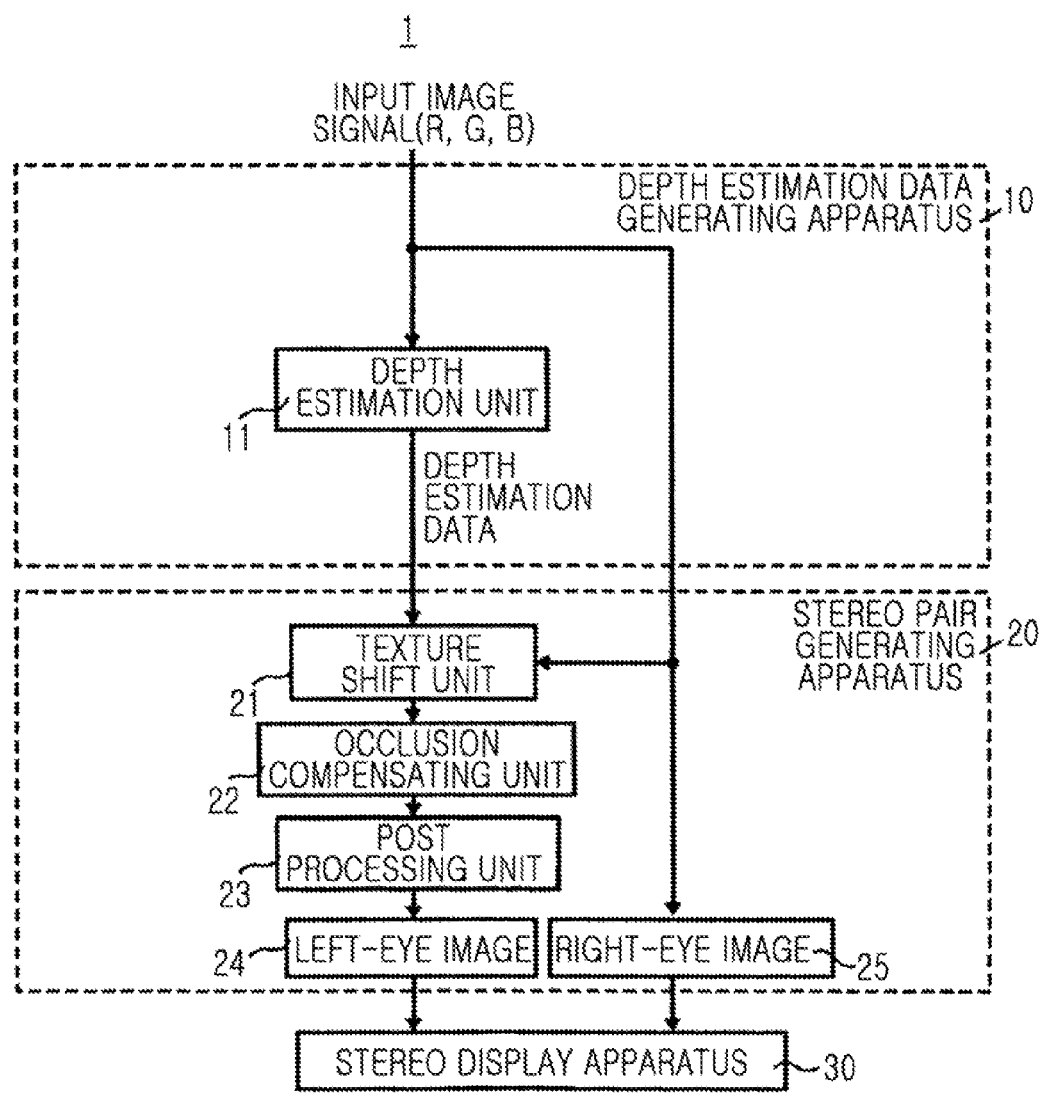
FIG. 1 is a block diagram showing a pseudo three-dimensional (3D) image generating apparatus according to an embodiment of the present invention.

FIG. 1 is a block diagram showing a pseudo three-dimensional (3D) image generating apparatus 1 according to an embodiment of the present invention. The pseudo 3D image generating apparatus 1 of the present embodiment is an apparatus performing a so-called 2D-3D conversion which generates a pseudo 3D color image from a 2D color image (non-3D image) to which depth information is neither explicitly included nor implicitly included like a stereo image. The pseudo 3D image generating apparatus 1 generates an image having a viewpoint different from a viewpoint of the non-3D image based on an input image signal of the non-3D mage.

The pseudo 3D image generating apparatus 1 includes a depth estimation data generating apparatus 10 which generates depth estimation data with respect to the input image signal of the non-3D image, and a stereo pair generating apparatus 20 which generates an image having a viewpoint different from an input non-3D image, wherein the image having the different viewpoint constitutes a pseudo 3D image with the input non-3D image, from the depth estimation data, and outputs the image having the different viewpoint with the input non-3D image as a stereo pair. A stereo display apparatus 30 displays a pseudo 3D image by receiving the stereo pair output from the stereo pair generating apparatus 20 as an input signal.

The depth estimation data generating apparatus 10 includes a depth estimation unit 11 constituting an embodiment of a depth estimation data generating apparatus of the present invention. The depth estimation unit 11 will be described in detail below. The stereo pair generating apparatus 20 includes a texture shift unit 21 which shifts a texture of the input non-3D image according to depth estimation data generated by the depth estimation unit 11, an occlusion compensating unit 22 which compensates for occlusion, and a post processing unit 23 which performs a post process. The stereo pair generating apparatus 20 outputs a left-eye image 24 that has been shifted from the post processing unit 23 while outputting a right-eye image 25 constituting the input image signal. In other words, when the input non-3D image is the right-eye image 25, the stereo pair generating apparatus 20 generates the left-eye image 24 constituting a pseudo 3D image with the right-eye image 25, and outputs the left-eye image 24 with the right-eye image 25 as a stereo pair. The stereo pair generating apparatus 20 constitutes a different viewpoint image generating unit which generates an image having a different viewpoint by shifting the texture of the non-3D image by an amount according to the depth estimation data of a corresponding portion based on the depth estimation data and the non-3D image.

A structure and operation of the depth estimation unit 11 constituting an embodiment of a depth estimation data generating apparatus of the present invention will now be described in detail.

Figure 2:
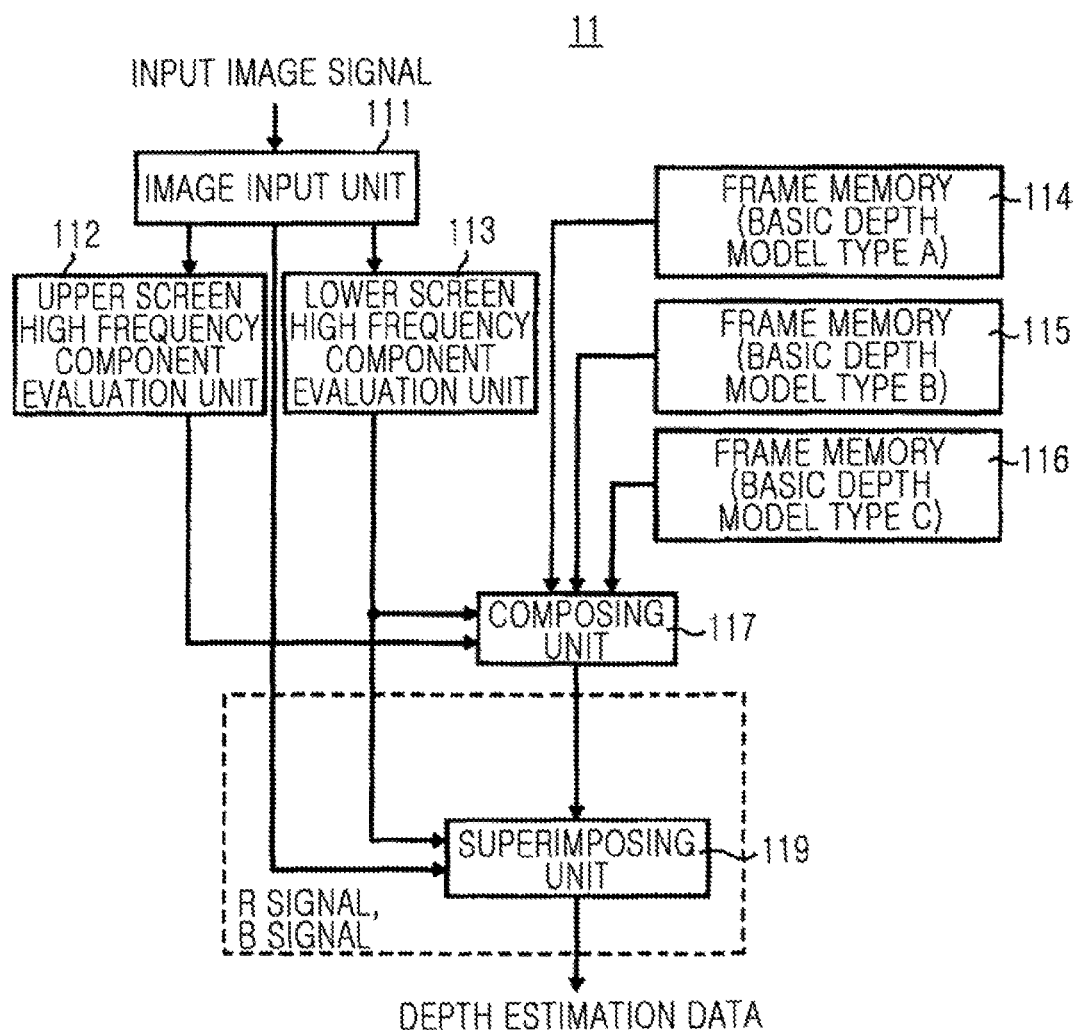
FIG. 2 is a block diagram of a depth estimation unit constituting a depth estimation data generating apparatus, according to an embodiment of the present invention.

FIG. 2 is a block diagram of the depth estimation unit 11 according to an embodiment of the present invention. As shown in FIG. 2, the depth estimation unit 11 includes an image input unit 111, an upper screen high frequency component evaluation unit 112, a lower screen high frequency component evaluation unit 113, frame memories 114 through 116, a composing unit 117, and a superimposing unit 119. The depth estimation unit 11 is characterized in including the superimposing unit 119.

In FIG. 2, the image input unit 111 temporarily stores an input image signal per one frame constituting a non-3D image signal by including a frame memory, and then supplies the input image signal per one frame to the upper screen high frequency component evaluation unit 112 and the lower screen high frequency component evaluation unit 113, while supplying a red (R) signal and a blue (B) signal in the input image signal to the superimposing unit 119.

The upper screen high frequency component evaluation unit 112 and the lower screen high frequency component evaluation unit 113 each constitutes a first calculating unit which calculates a composition ratio between images of three types of basic depth models described below, by using statistics of at least some pixel values in a predetermined region in a screen of the non-3D image, so as to estimate a scene structure of the non-3D image.

In other words, the upper screen high frequency component evaluation unit 112 obtains a high frequency component in a region corresponding to about 20% of an upper screen with respect to the input image signal per one frame to calculate an upper screen high frequency component evaluation value top_act. Then, the upper screen high frequency component evaluation unit 112 supplies the upper screen high frequency component evaluation value top_act to the composing unit 117. The lower screen high frequency component evaluation unit 113 obtains a high frequency component in a region corresponding to about 20% of a lower screen with respect to the input image signal per one frame to calculate a lower screen high frequency component evaluation value bottom_act. Then, the lower screen high frequency component evaluation unit 113 supplies the lower screen high frequency component evaluation value bottom_act to the composing unit 117.

Meanwhile, the frame memory 114 stores an image of a basic depth model type A, the frame memory 115 stores an image of a basic depth model type B, and the frame memory 116 stores an image of a basic depth model type C. Each of the images of the basic depth model types A through C is an image indicating a depth value of a basic scene structure for generating a pseudo 3D image signal.

Figure 3:
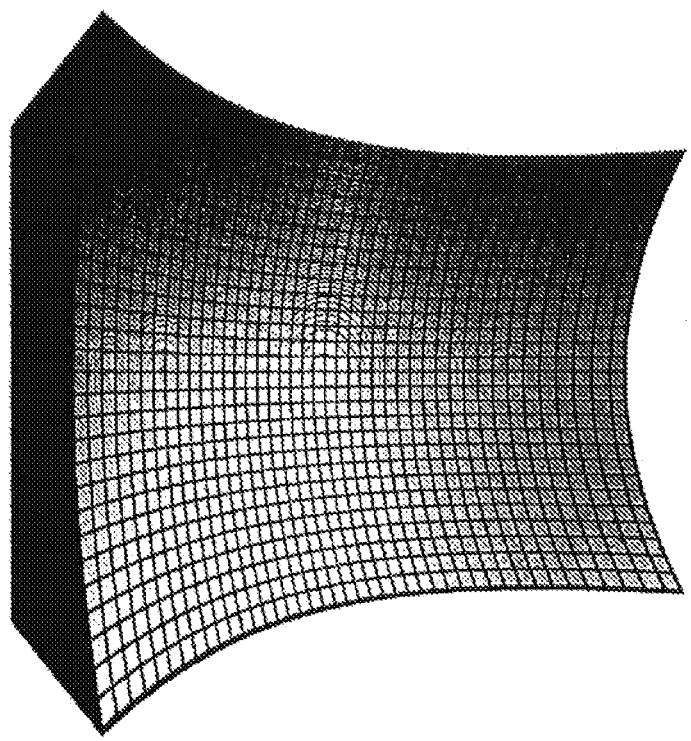
FIG. 3 is a view showing a 3D structure of a basic depth model type A, according to an embodiment of the present invention.

For example, the image of the basic depth model type A is an image of a depth model with a recess surface having a spherical shape, i.e., an image having a 3D structure shown in FIG. 3. The image of the basic depth model type A is used in many cases.

Figure 4:
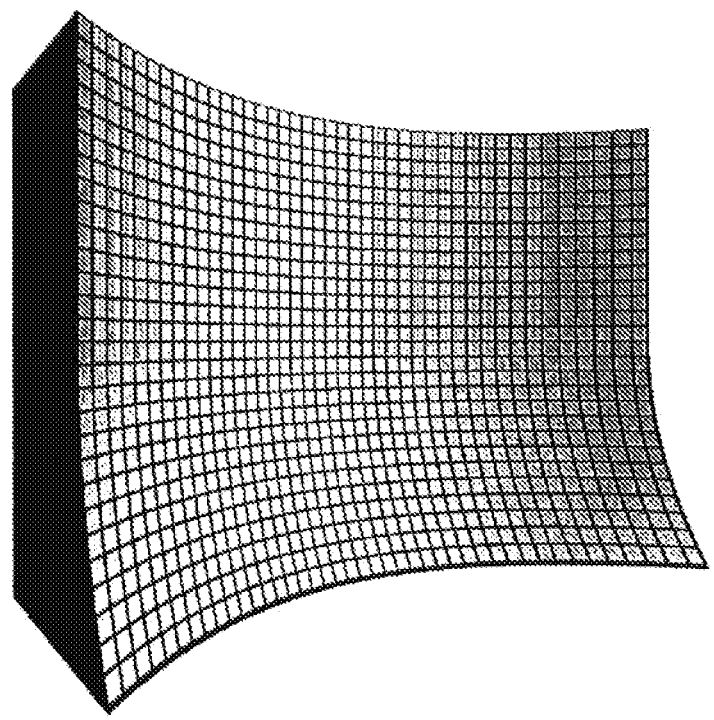
FIG. 4 is a view showing a 3D structure of a basic depth model type B, according to an embodiment of the present invention.

Also, the image of the basic depth model type B is obtained by replacing a top portion of the image of the basic depth model type A with an arch-shaped cylindrical surface, instead of a spherical surface. As a 3D structure shown in FIG. 4, the image of basic depth model type B is a image of model in which the top portion is a cylindrical surface (an axis is in a vertical direction) and a bottom portion is a recess surface (spherical surface).

Figure 5:
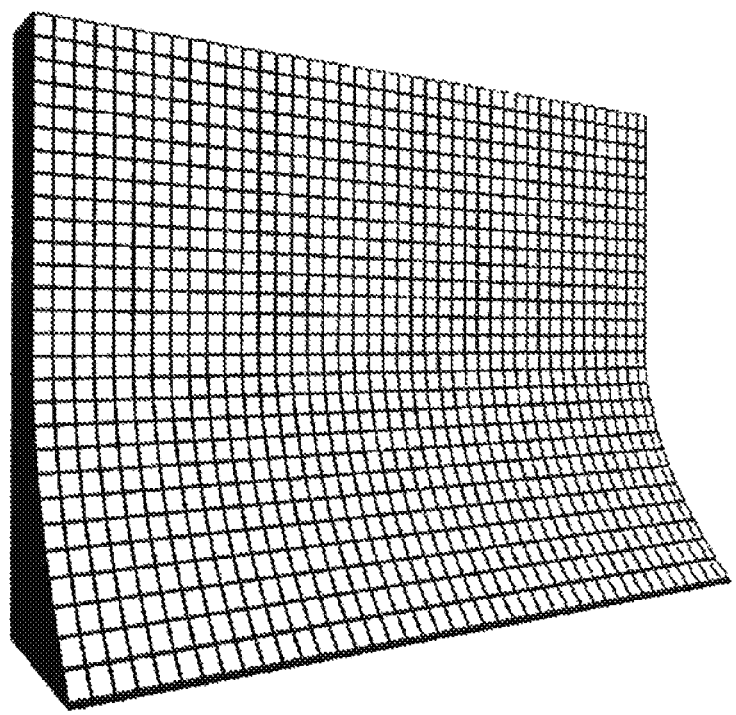
FIG. 5 is a view showing a 3D structure of a basic depth model type C, according to an embodiment of the present invention.

Also, the image of the basic depth model type C is an image of a model having a 3D structure shown in FIG. 5, wherein a top portion is a planar surface and a bottom portion is a cylindrical surface continuously extending down from the planar surface and curving further forwardly, that is the top portion is the planar surface and the bottom portion is the cylindrical surface (an axis is in a horizontal direction). The images of the basic depth model types A through C respectively stored in the frame memories 114 through 116 constituting a basic depth model type generating unit are supplied to the composing unit 117.

The composing unit 117 first automatically calculates a composition ratio k1 of the basic depth model type A, a composition ratio k2 of the basic depth model type B, and a composition ratio k3 of the basic depth model type C, by using a predetermined method based on the upper screen high frequency component evaluation value top_act supplied from the upper screen high frequency component evaluation unit 112 and the lower screen high frequency component evaluation value bottom_act supplied from the lower screen high frequency component evaluation unit 113, not considering a scene of an image. Also, a sum of the three composition ratios k1 through k3 is always 1.

Figure 6:
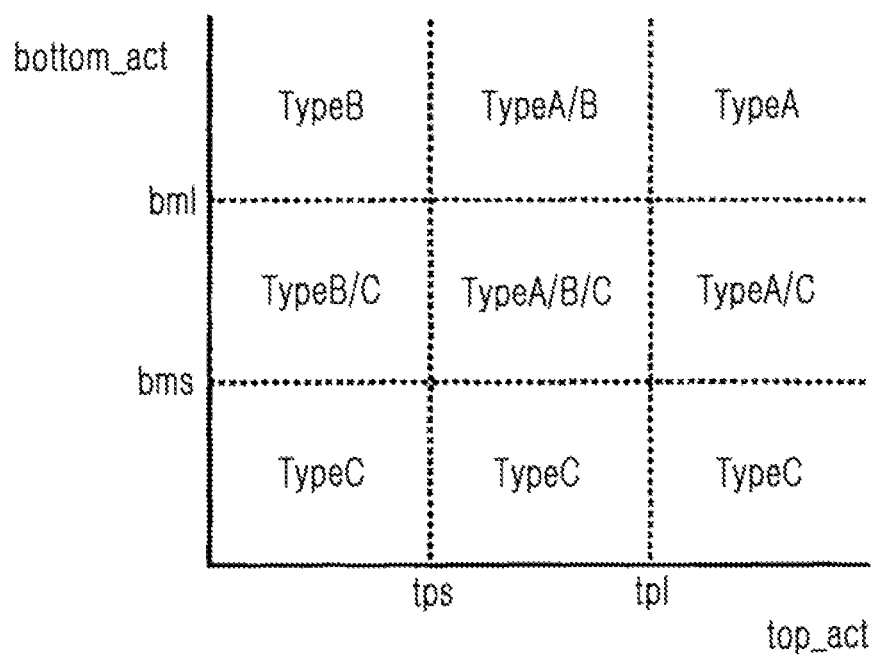
FIG. 6 is a diagram for explaining an example of a condition for determining a composition ratio of a basic depth model.

FIG. 6 is a diagram for explaining an example of a condition for determining a composition ratio. Referring to FIG. 6, a composition ratio is determined according to ratios of each of the upper screen high frequency component evaluation value (hereinafter, abbreviated to a top high frequency component evaluation value) top_act in a horizontal axis and the lower screen high frequency component evaluation value (hereinafter, abbreviated to a bottom high frequency component evaluation value) bottom_act in a vertical axis, and predetermined values tps, tpl, bms, and bml. The images of the basic depth model types A through C and the determination condition for the composition ratio is identical to those disclosed in Patent Document 1 by the present applicant, but are not limited thereto.

Regions where a plurality of types are written in FIG. 6, composition ratio are linearly composed according to high frequency component evaluation values. For example, in a region "Type A/B" of FIG. 6, a ratio of Type A which is a value of the basic depth model type A and Type B which is a value of the basic depth model type B is determined based on a ratio of the top high frequency component evaluation value top_act and the bottom high frequency component evaluation value bottom_act as below, and Type C which is a value of the basic depth model type C is not used to determine the ratio.

Type $A$:Type $B$:Type $C$=(top_act−tps):(tpl−top_act):0

Also, in a region "Type A/B/C" of FIG. 6, a value of Type A/B/C is determined as below by employing an average of Type A/B and Type A/C.

Type $A$:Type $B$:Type $C$=(top_act−tps)+(bottom_act−bms):(tpl−top_act):(bml−bottom_act)

Also, each of the composition ratios k1, k2, and k3 is calculated as follows:

$k1$=Type $A$/(Type $A$+Type $B$+Type $C$)  (1)

$k2$=Type $B$/(Type $A$+Type $B$+Type $C$)  (2)

$k3$=Type $C$/(Type $A$+Type $B$+Type $C$)  (3)

Continuously, the composing unit 117 calculates each of a first multiplication result of the composition ratio k1 and Type A, i.e., the value of the basic depth model type A, a second multiplication result of the composition ratio k2 and Type B, i.e., the value of the basic depth model type B, and a third multiplication result of the composition ratio k3 and Type C, i.e., the value of the basic depth model type C, from among the composition ratios k1 through k3 calculated as above, and additionally adds the first through third multiplication results to generate an image signal constituting a composed depth model.

The superimposing unit 119 generates depth estimation data based on a basic depth model-composed image signal (corresponds to an image signal of a background) supplied from the composing unit 117, and R and B signals (correspond to an object signal indicating object information) supplied from the image input unit 111.

Figure 7:
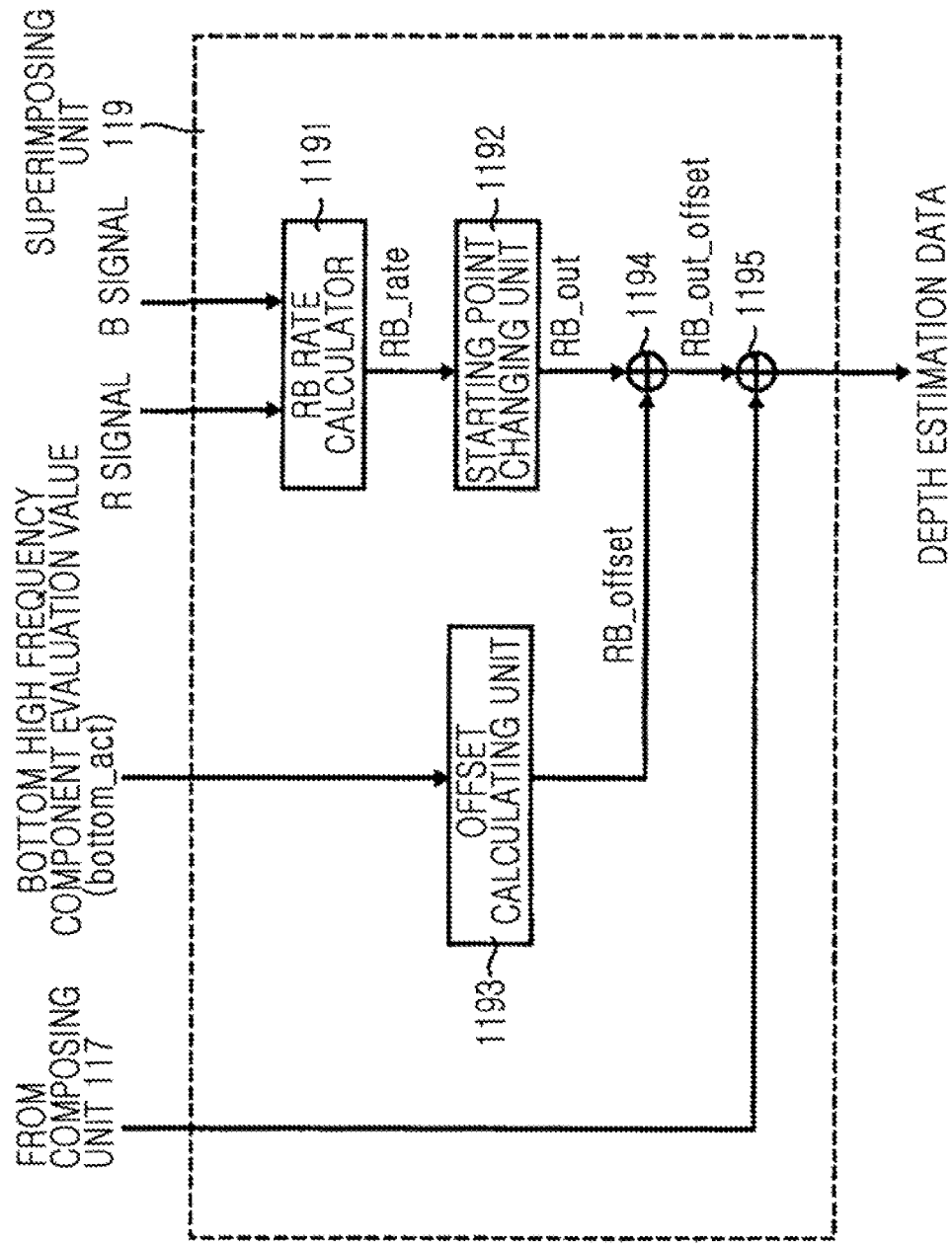
FIG. 7 is a block diagram of a superimposing unit of FIG. 2, according to an embodiment of the present invention.

FIG. 7 is a block diagram of the superimposing unit 119 of FIG. 2, according to an embodiment of the present invention. As shown in FIG. 7, the superimposing unit 119 includes an RB rate calculator 1191 which calculates an RB rate RB_rate based on the R and B signals supplied from the image input unit 111, a starting point changing unit 1192 which changes a starting point based on the RB rate RB_rate, an offset calculating unit 1193 which calculates an offset based on the bottom high frequency component evaluation value bottom_act from the lower screen high frequency component evaluation unit 113, an adding unit 1194 which adds a signal from the starting point changing unit 1192 and the offset, and an adding unit 1195 which generates final depth estimation data by adding an addition signal output from the adding unit 1194 and an image signal constituting a composed depth model supplied from the composing unit 117.

The RB rate calculator 1191 and the starting point changing unit 1192 each constitutes an object signal generating unit of the present invention. An object signal indicates object information about concavity and convexity of a pseudo 3D image. Also, the offset calculating unit 1193 constitutes a second calculating unit which calculates an offset value for emphasizing the object information about the concavity and convexity indicated by the object signal, by using statistics of at least some of the pixel values in the predetermined region in the screen of the non-3D image of the present invention. Also, the adding unit 1194 constitutes a compensating unit which compensates for the object signal based on the offset value.

Figure 8:
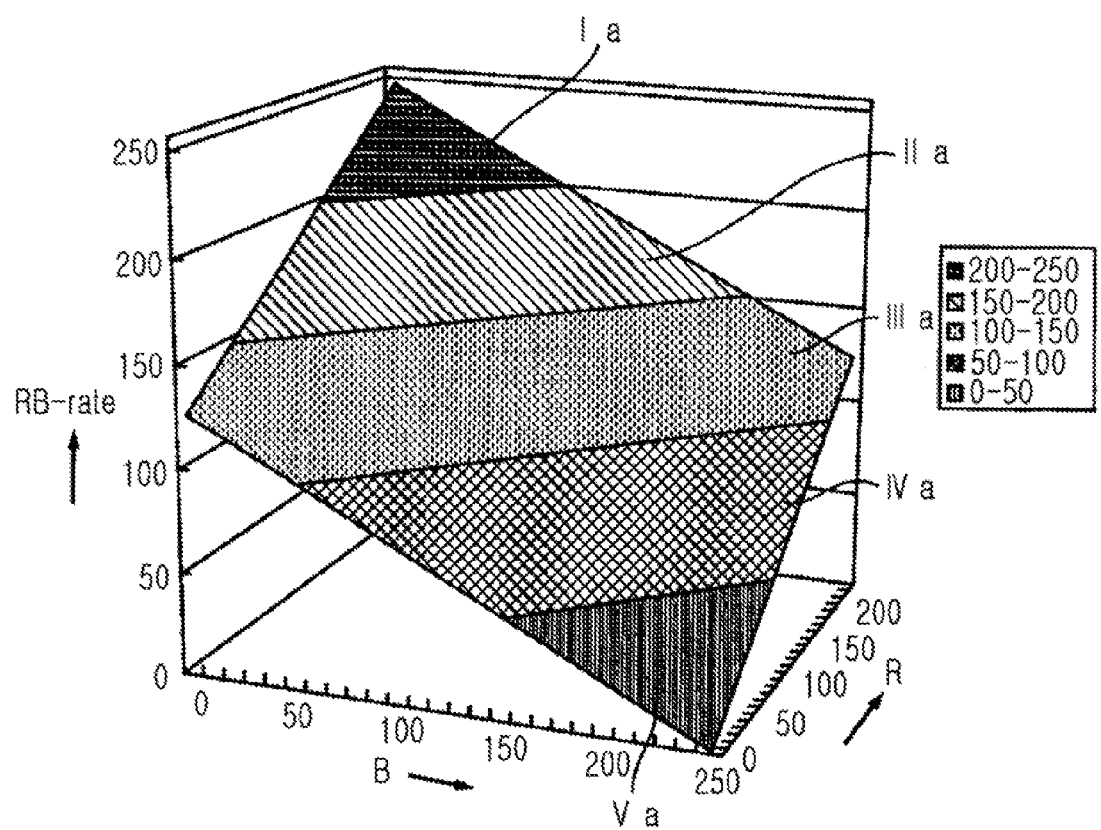
FIG. 8 is a diagram for explaining an example of an RB rate calculator of FIG. 7.

FIG. 8 is a diagram for explaining an example of the RB rate calculator 1191. The RB rate calculator 1191 calculates a value of the RB rate RB_rate shown in a Z-axis based on a value of an input B signal shown in an X-axis and a value of an input R signal shown in a Y-axis of FIG. 8. Here, since the B and R signals, for example, are signals showing a gray scale of a pixel in 8 bits, values of the B and R signals are each in a range from 0 to 255. A value of the RB rate RB_rate is calculated in pixel units as follows:

$RB\_rate = (0.5 \times R) + \{0.5 \times (255 - B)\}$  (4)

Here, in Equation 4, R denotes a value of an R signal and B denotes a value of a B signal.

In FIG. 8, the value of the RB rate RB_rate is in any range from among a range Ia from 200 to 250, a range IIa from 150 to 200, a range IIIa from 100 to 150, a range IVa from 50 to 100, and a range Va from 0 to 50. The RB rate RB_rate has a high value in the range Ia when red or yellow is strong in a color of the input image signal, and has a low value in the range Va when blue or cyan is strong in the color of the input image signal Next, the starting point changing unit 1192 changes the center of the RB rate RB_rate calculated by the RB rate calculator 1191 to a 0 starting point, and outputs a changed RB rate RB_out to the adding unit 1194 as follows:

$RB\_out = RB\_rate - 128$  (5)

Figure 9:
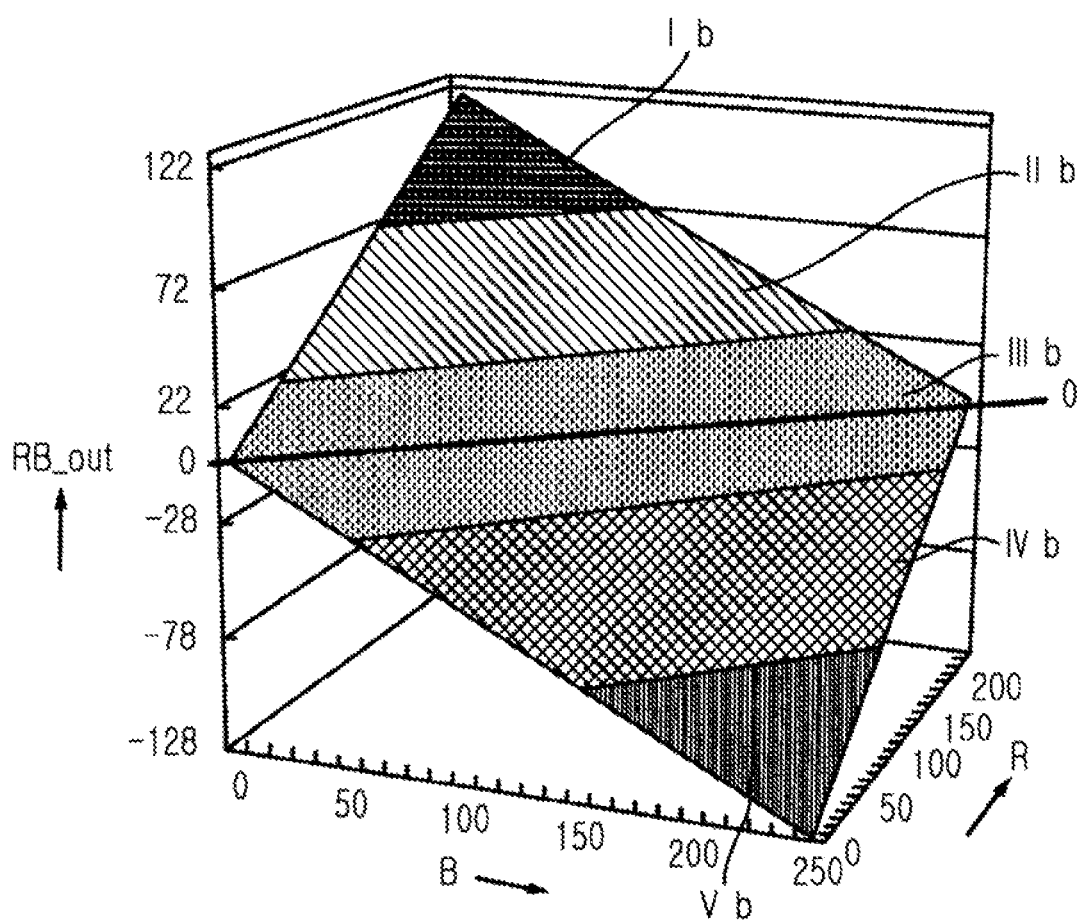
FIG. 9 is a diagram for explaining an example of a starting point changing unit of FIG. 7.

Accordingly, in FIG. 9, the starting point changed RB rate RB_out output from the starting point changing unit 1192 has a value shown in a Z-axis with respect to a value (any one from 0 to 255) of an input B signal component shown in an X-axis and a value (any one from 0 to 255) of an input R signal component shown in a Y-axis, and is obtained by changing the center of the RB_rate shown in the Z-axis of FIG. 8 to the 0 starting point. In other words, in FIG. 9, values in the ranges Ia, IIa, IIIa, IVa, and Va of FIG. 8 are changed respectively to values in the ranges Ib, IIb, IIIb, IVb, and Vb of FIG. 9

The center of the RB rate RB_rate is changed to the 0 starting point by the starting point changing unit 1192 so that, by changing the center to the 0 starting point, an addition value wherein an image having strong red protrudes forward and an image having strong blue recesses inward is obtained when the RB rate RB_out is added to a bottom high frequency component evaluation value by the adding unit 1194. Accordingly, the starting point changed RB rate RB_out calculated via Equation 5 and shown in FIG. 9 has a value that disposes an image portion having strong red in front (value having a high positive value) and disposes an image portion having strong blue inside (value having a high negative absolute value). Also, since a black or white (gray scale) output value of the starting point changed RB rate RB_out is 0, depth does not change.

Figure 10:
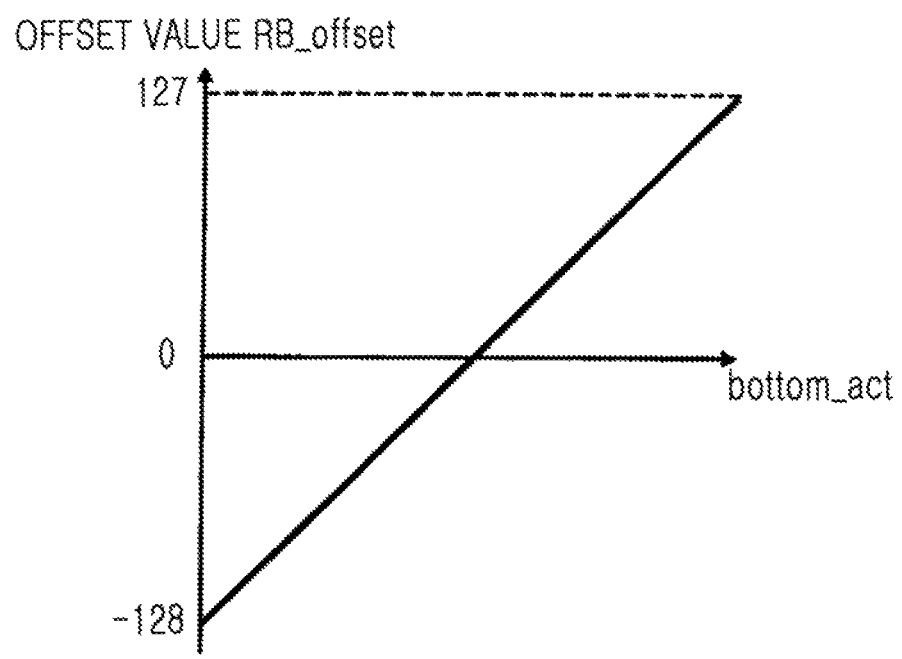
FIG. 10 is an input and output characteristic diagram of an example of an offset calculating unit of FIG. 7.

Meanwhile, the offset calculating unit 1193 generates an offset value RB_offset according to the bottom high frequency component evaluation value bottom_act, and outputs the offset value RB_offset to the adding unit 1194, FIG. 10 shows an input and output characteristic of an example of the offset calculating unit 1193, wherein a horizontal axis denotes an input bottom high frequency component evaluation value bottom_act, and a vertical axis denotes an output offset value RB_offset. As shown in FIG. 10, according to the input and output characteristic of the offset calculating unit 1193, the offset value RB_offset is increased as the bottom high frequency component evaluation value bottom_act is increased.

A reason thereof is as follows: As shown in FIG. 6, images of basic depth model types are composed such that the composing unit 117 selects an image of a plane model (the basic depth model type C), wherein a top portion is a planar surface and a bottom portion is a cylindrical surface (axis is in a horizontal direction) as shown in FIG. 5 when the bottom high frequency component evaluation value bottom_act is small, and selects an image of a recess surface (spherical) model (the basic depth model type A or B) shown in FIG. 3 or 4 when the bottom high frequency component evaluation value bottom_act is high.

The offset calculating unit 1193 calculates the offset value RB_offset so as to adjust to the selection of the basic depth model type. In other words, the offset calculating unit 1193 determines the offset value RB_offset having a low value, which emphasizes depth of an object, when the bottom high frequency component evaluation value bottom_act close to a plane model is low, while determining the offset value RB_offset having a high value, which emphasizes extrusion of an object, when the bottom high frequency component evaluation value bottom_act close to a recess surface model is high. Accordingly, a sense of separation between a background and an object may be emphasized, thereby increasing a 3D effect.

Figure 11:
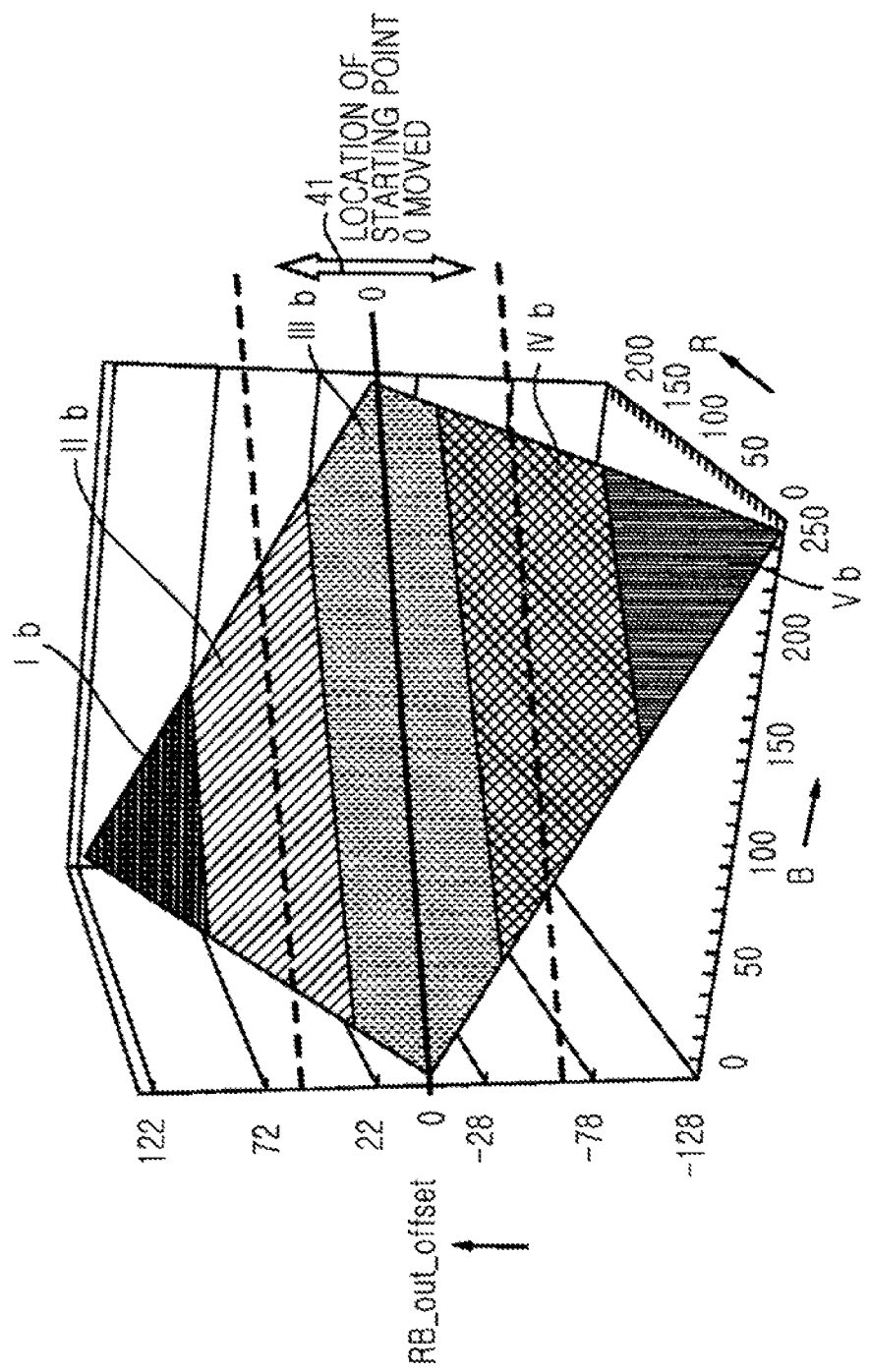
FIG. 11 is a diagram for explaining an example of an offset adding unit of FIG. 7.

The adding unit 1194 adds the offset value RB_offset and the starting point changed RB rate RB_out from the starting point changing unit 1192, and outputs an RB rate RB_out_offset of which a starting point has been changed and to which an offset is added. FIG. 11 is a diagram for describing generating of the RB rate RB_out_offset by adding the offset value RB_offset to the starting point changed RB rate RB_out. In FIG. 11, the same reference numerals denote the same elements in FIG. 9, and descriptions thereof are omitted herein.

Referring to FIG. 11, the RB rate RB_out_offset is generated as a starting point of the starting point changed RB rate RB_out shown in the Z-axis of FIG. 9 is changed according to the offset value RB_offset as shown by a reference numeral 41 in a Z-axis of FIG. 11, with respect to a value of an input B signal (any one from 0 to 255) shown in an X-axis and a value of an input R signal (any one from 0 to 255) shown in a Y-axis.

Also, the adding unit 1195 generates and outputs final depth estimation data by adding the RB rate RB_out_offset to which the offset is added output from the adding unit 1194 to an image signal constituting the composed depth model supplied from the composing unit 117.

Since the final depth estimation data is generated based on the RB rate RB_out of which the center is changed to the 0 starting point according to Equation 5, an image portion having strong red is disposed in front, an image portion having strong blue is disposed inside, and an image portion in black or white (gray scale) does not change the depth, based on following three characteristics:

(1) An image portion having a strong R signal component is disposed in front because a size of the R signal component is highly likely to match concavity and convexity of a source image under a circumstances near to a front light and under a condition that a change of a degree of brightness (luminosity) of texture is not large. The texture is an element forming an image and includes a single pixel or a pixel group.

(2) An image portion having a strong B signal component is disposed inside because a farther object looks blue due to light scattering, which is general laws of physics (aerial perspective).

(3) Warm colors are advancing colors in chromatics and are recognized to have advancing depth than cold colors (receding colors), whereas depths of cold colors are recognized to recede more than warm colors.

A structure and operation of the stereo pair generating apparatus 20 are described with reference to FIG. 1. The texture shift unit 21 generates an image signal having a different viewpoint from an input image signal, based on the depth estimation data generated by the depth estimation unit 11 as above, and the input image signal. For example, when the input image signal is a right-eye image signal indicating the right-eye image 25, the texture shift unit 21 generates a left-eye image signal having a viewpoint moved to the left, based on a viewpoint of the right-eye image signal displayed on a screen. In this case, since the closer an image is, the more inward (towards a nose) the image looks to a user when a texture is displayed in a close-range view with respect to the user, the texture shift unit 21 generates an image signal where the texture is moved to the right of the screen by an amount according to the depth. Also, since the farther an image is, the more outward the image looks to the user when the texture is displayed in a distant view with respect to the user, the texture shift unit 21 generates an image signal where the texture is moved to the left of the screen by an amount according to the depth.

Here, depth estimation data of each pixel is indicated in a value Dd in 8 bits. The texture shift unit 21 generates an image signal where a texture of an input right-eye image signal corresponding to the value Dd is shifted to the right by a (Dd−m)/n pixel for each pixel, in an order from a small value Dd (i.e., from a texture disposed inside the screen). Here, m denotes a parameter (convergence value) showing extrusion, and n denotes a parameter (depth value) showing depth.

Also, for the user, a texture having a small value Dd indicating a depth estimation value is shown to be inside the screen, and a texture having a large value Dd indicating a depth estimation value is shown to be in front of the screen. The value Dd indicating depth estimation data, the convergence value m, and the depth value n are each in a range from 0 to 255, and for example, the convergence value m is 200 and the depth value n is 20.

The occlusion compensating unit 22 performs occlusion compensation with respect to the image signal having the different viewpoint output from the texture shift unit 21, and supplies the occlusion-compensated image signal to the post processing unit 23. Occlusion means a portion where a texture does not exist by a relationship change in an image after shifting a texture. The occlusion compensating unit 22 charges an occlusion location by using an original input right-eye image signal corresponding to the texture-shifted image signal. Alternatively, occlusion may be compensated for by using a method disclosed in a well-known document (Kunio Yamada, Kenji Mochizuki, Kiyoshi Aizawa, and Takahiro Saito: "Disocclusion Based on the Texture Statistics of the Image Segmented by the Region Competition Algorithm" The Journal of the Institute of Image Information and Television Engineers, Vol. 56, No. 5, pp. 863-866 (2002.5)).

The post processing unit 23 constituting a post processing means performs a post process, such as smoothing or noise removal, on the image signal that is occlusion compensated by the occlusion compensating unit 22, by using a well-known method as occasion demands, and outputs a left-eye image signal indicating the left-eye image 24.

Here, since the convergence value m and the depth value n are fixed values and are each in the range from 0 to 255, whereas the value Dd of the depth estimation data changes by the input image signal, regarding the (Dd−m)/n pixel constituting the shift amount of the image signal output by the texture shift unit 21, a maximum pixel shift amount may be obtained. When the maximum pixel shift amount is determined, a maximum parallax angle may be obtained from a pixel number of an image and a standard viewing distance during reproduction. When the convergence value m and the depth value n are suitably set, a 2D-3D converted image is narrowed down to a parallax angle in a determined range. Thus, the pseudo 3D image generating apparatus 1 outputs the left-eye image signal that is 2D-3D converted and output from the post processing unit 23, as the left-eye image 24, and uses the left-eye image signal as a standard (sample) for adjusting a base length or convergence angle. Also, the pseudo 3D image generating apparatus 1 outputs the input image signal as the right-eye image 25.

As such, the stereo pair generating apparatus 20 generates the left-eye image 24 in a different viewpoint from the input non-3D image (here, the right-eye image 25) based on the depth estimation data generated by the depth estimation unit 11, and outputs the left-eye image 24 with the input non-3D image (the right-eye image 25) as a stereo pair displaying a pseudo 3D image. The left-eye image 24 and the right-eye image 25 are output to the stereo display apparatus 30.

The stereo display apparatus 30 includes a projection system in which polarized glasses are used, a projection system or a display system in which a field sequential display and liquid-crystal shutter glasses are combined, a lenticular-mode stereo display, an anaglyph-mode stereo display, a head-mounted display, and so on. In particular, the stereo display apparatus 30 includes a projector system composed of two projectors each corresponding to an image of a stereo image.

A pseudo 3D image display system capable of stereovision by using a non-3D image as a pseudo 3D image may be provided by combining the depth estimation data generating apparatus 10, the stereo pair generating apparatus 20, and the stereo display apparatus 30.

Figure 12A:
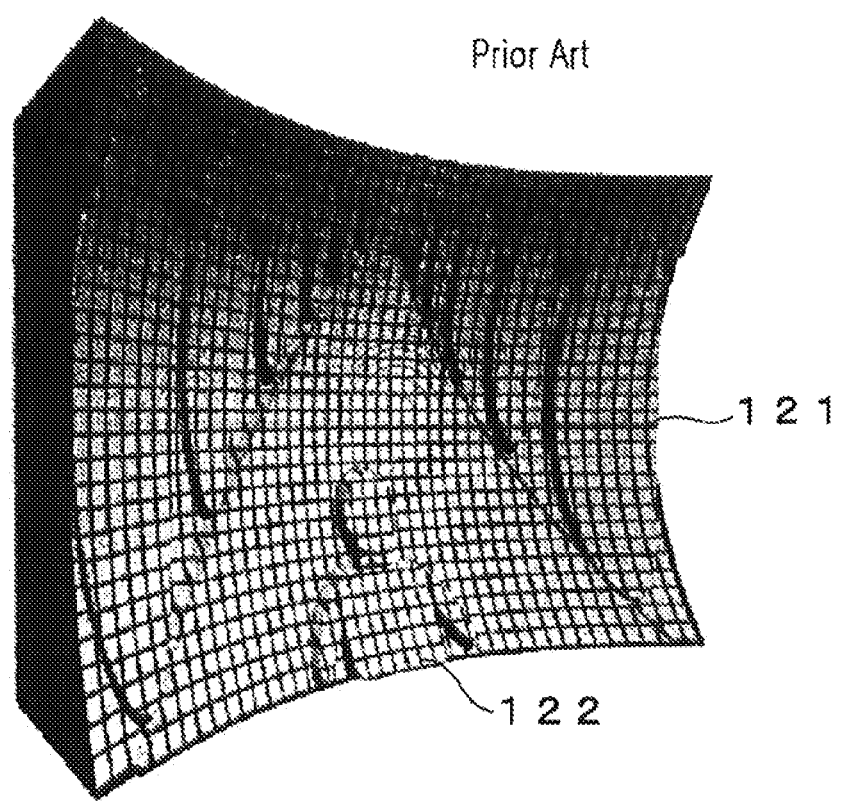
FIGS. 12A and 12B are views for comparing an example of a pseudo 3D image of Patent Document 1, and an example of a pseudo 3D image generated by depth estimation data of the present invention.
Figure 12B:
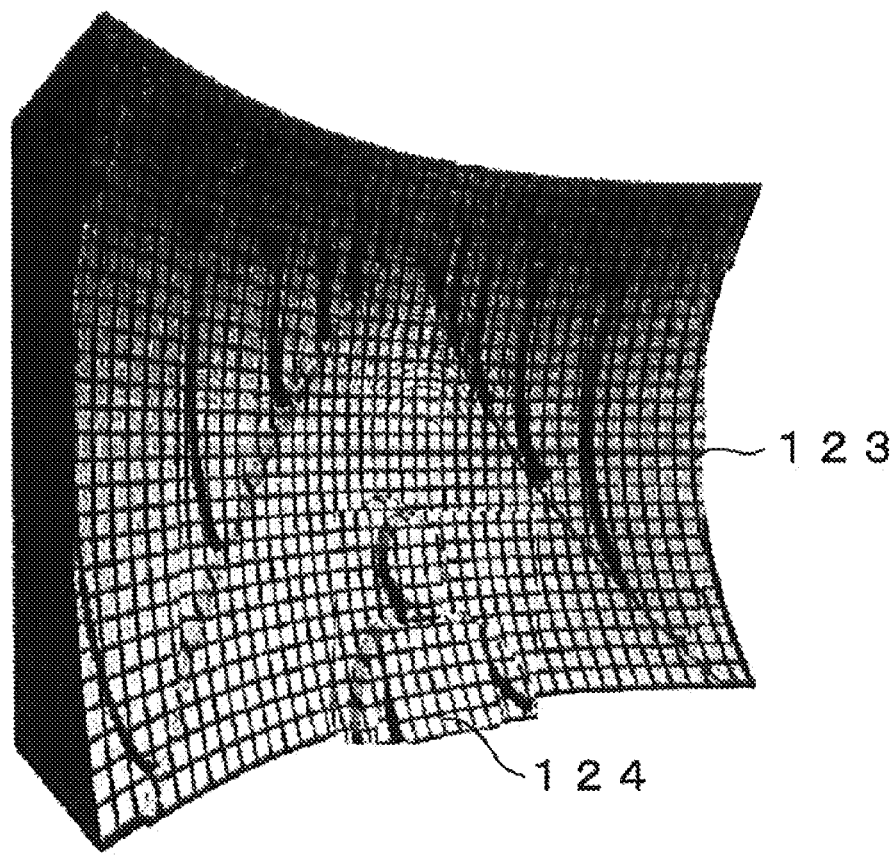

As described above, according to the present embodiment, since the depth estimation data generating apparatus 10 generates depth estimation data wherein a degree of superimposition of object information is changed according to a composition of an image of a selected basic depth model such that the object information is superimposed on the image of the basic depth model by setting a value of the object information to emphasize depth when the composition of the image of the selected basic depth model is close to a planar surface, and setting the value of the object information to emphasize extrusion when the composition of the image of the selected basic depth model is close to a recess surface, a pseudo 3D image generated based on the depth estimation data, for example, has an improved sense of separation between a background 123 and an object (person) 124 as shown in FIG. 12B compared to a conventional technology, and thus, a 3D effect is increased.

However, the present invention is not limited to above embodiments, and for example, regarding a stereo pair, a stereo pair may include an original image of a left-eye image and a different viewpoint image of a right-eye image by reversing right and left. Also, the pseudo 3D image generating apparatus 1 of FIG. 1 generates the left-eye image 24 by using the input non-3D image as the right-eye image 25, but alternatively, a right-eye image may be generated by using the input non-3D image as a left-eye image, and furthermore, a stereo pair may be formed by using right- and left-eye images as a different viewpoint image, i.e., by using a different viewpoint image in which a viewpoint is moved to the right and a different viewpoint image in which a viewpoint is moved to the left.

Also, an example of the stereo pair generating apparatus 20 which uses two viewpoints has been described, but when an image is displayed via a display apparatus capable of displaying two viewpoints or more, a plural viewpoints image generating apparatus which generates a number of different viewpoint images matching the number of viewpoints may be provided.

Also, a pseudo 3D display system may include an audio output unit. In this case, an environmental sound matching an image may be added with respect to image content that does not contain audio information, such as a still image.

Also, the present invention is not limited to providing the pseudo 3D image generating apparatus 1 of FIG. 1 or the depth estimation data generating apparatus 10 of FIGS. 2 and 7 by using hardware, and alternatively, a pseudo 3D image or depth estimation data may be generated by using software according to a computer program. In this case, the computer program may be recorded via a recording medium or via a network to a computer.

According to the present invention, a sense of separation between an object and a background is improved, thereby increasing a 3D effect.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A depth estimation data generating apparatus comprising:
   a generating unit which generates images of a plurality of basic depth models respectively indicating depth values of a plurality of basic scene structures;
   a first calculating unit which calculates a composition ratio between the images of the plurality of basic depth models by using statistics of pixel values in a predetermined upper portion or a predetermined lower portion in a screen of a non-3D image, so as to estimate a scene structure of the non-3D image to which depth information is neither included explicitly nor included implicitly like a stereo image;
   a composing unit which composes the images of the plurality of basic depth models generated by the generating unit according to the composition ratio and generates a basic depth model-composed image;
   an object signal generating unit which generates an object signal indicating object information about concavity and convexity of a pseudo 3D image from the non-3D image;
   a second calculating unit which calculates an offset value for emphasizing the object information about the concavity and convexity indicated by the object signal, by using the statistics of the pixel values in the predetermined upper portion or the predetermined lower portion in the screen of the non-3D image;
   a compensating unit which compensates for the object signal based on the offset value; and
   an adding unit which adds the object signal compensated for by the compensating unit to the basic depth model-composed image composed by the composing unit to generate depth estimation data for generating an image having a viewpoint different from the non-3D image, the image constituting a pseudo 3D image with the non-3D image,
   wherein the object signal generating unit comprises:
   a ratio calculating unit which calculates a signal ratio of a red signal and a blue signal constituting anima e signal of the non-3D image in pixel units; and
   a starting point changing unit which outputs a value obtained by changing a center of the signal ratio calculated by the ratio calculating unit to a 0 starting point, as the object signal.

2. The depth estimation data generating apparatus of claim 1, wherein the second calculating unit calculates an offset value emphasizing depth when the first calculating unit calculates an image of a basic depth model close to a plane model from among the images of the plurality of basic depth models at a higher composition ratio than those of images of other basic depth models, and calculates an offset value emphasizing extrusion when the first calculating unit calculates an image of a basic depth model close to a recess surface model from among the images of the plurality of basic depth models at a higher composition ratio than those of images of other basic depth models.

3. A depth estimation data generating apparatus comprising:
   a generating unit which generates images of a plurality of basic depth models respectively indicating depth values of a plurality of basic scene structures;
   a first calculating unit which calculates a composition ratio between the images of the plurality of basic depth models by using statistics of at least some pixel values in a predetermined region in a screen of a non-3D image, so as to estimate a scene structure of the non-3D image to which depth information is neither included explicitly nor included implicitly like a stereo image;
   a composing unit which composes the images of the plurality of basic depth models generated by the generating unit according to the composition ratio and generates a basic depth model-composed image;
   an object signal generating unit which generates an object signal indicating object information about concavity and convexity of a pseudo 3D image from the non-3D image;
   a second calculating unit which calculates an offset value for emphasizing the object information about the concavity and convexity indicated by the object signal, by using the statistics of at least some of the pixel values in the predetermined region in the screen of the non-3D image;
   a compensating unit which compensates for the object signal based on the offset value; and
   an adding unit which adds the object signal compensated for by the compensating unit to the basic depth model-composed image composed by the composing unit to generate depth estimation data for generating an image having a viewpoint different from the non-3D image, the image constituting a pseudo 3D image with the non-3D image,
   wherein the object signal generating unit comprises:
   a ratio calculating unit which calculates a signal ratio of a red signal and a blue signal constituting an image signal of the non-3D image in pixel units; and
   a starting point changing unit which outputs a value obtained by changing a center of the signal ratio calculated by the ratio calculating unit to a 0 starting point, as the object signal.

4. A depth estimation data generating method comprising:
   calculating a composition ratio between images of a plurality of basic depth models respectively indicating depth values of a plurality of basic scene structures, by using statistics of pixel values in a predetermined upper portion or a predetermined lower portion in a screen of a non-3D image, so as to estimate a scene structure of the non-3D image to which depth information is neither included explicitly nor included implicitly like a stereo image;
   generating a basic depth model-composed image by composing the images of the plurality of basic depth models according to the composition ratio;
   generating an object signal indicating object information about concavity and convexity of a pseudo 3D image from the non-3D image;
   calculating an offset value for emphasizing the object information about the concavity and convexity indicated by the object signal, by using the statistics of the pixel values in the predetermined upper portion or the predetermined lower portion in the screen of the non-3D image;
   compensating for the object signal based on the offset value; and
   adding the object signal compensated for during the compensating to the basic depth model-composed image composed during the generating of the basic depth model-composed image to generate depth estimation data for generating an image having a different viewpoint from the non-3D image, the image constituting a pseudo 3D image with the non-3D image,
   wherein the generating of the object signal comprises:
   calculating a signal ratio of a red signal and a blue signal constituting an image signal of the non-3D image in pixel units; and outputting a value obtained by changing a center of the calculated signal ratio to a 0 starting point, as the object signal.

5. A non-transitory computer readable storage medium having recorded thereon a depth estimation data generating program which is realized by a computer, the program comprising:

calculating a composition ratio between images of a plurality of basic depth models respectively indicating depth values of a plurality of basic scene structures, by using statistics of pixel values in a predetermined upper portion or a predetermined lower portion in a screen of a non-3D image, so as to estimate a scene structure of the non-3D image to which depth information is neither included explicitly nor included implicitly like a stereo image;

generating a basic depth model-composed image by composing the images of the plurality of basic depth models according to the composition ratio;

generating an object signal indicating object information about concavity and convexity of a pseudo 3D image from the non-3D image;

calculating an offset value for emphasizing the object information about the concavity and convexity indicated by the object signal, by using the statistics of the pixel values in the predetermined upper portion or the predetermined lower portion in the screen of the non-3D image;

compensating for the object signal based on the offset value; and adding the object signal compensated for during the compensating to the basic depth model-composed image composed during the generating of the basic depth model-composed image to generate depth estimation data for generating an image having a different viewpoint from the non-3D image, the image constituting a pseudo 3D image with the non-3D image, wherein the generating of the object signal comprises:

calculating a signal ratio of a red signal and a blue signal constituting an image signal of the non-3D image in pixel units; and outputting a value obtained by changing a center of the calculated signal ratio to a 0 starting point, as the object signal.

6. A pseudo 3D image generating apparatus comprising:

a different viewpoint image generating unit which generates a different viewpoint image by shifting a texture of a non-3D image by an amount according to depth estimation data of a portion corresponding to the texture of the non-3D image, based on the depth estimation data generated by the apparatus of claim 1 to which the non-3D image is supplied and the non-3D image to which depth information is neither included explicitly nor included implicitly like a stereo image; and an output unit which outputs a pseudo 3D image wherein one of the non-3D image and the different viewpoint image is a left-eye image and the other is a right-eye image.

7. A pseudo 3D image generating method comprising:

generating a different viewpoint image by shifting a texture of a non-3D image by an amount according to depth estimation data of a portion corresponding to the texture of the non-3D image, based on the depth estimation data generated by the method of claim 4 to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

8. A non-transitory computer readable storage medium having recorded thereon a pseudo 3D image generating program which is realized by a computer, the program comprising:

generating a different viewpoint image by shifting a texture of a non-3D image by an amount according to depth estimation data of a portion corresponding to the texture of the non-3D image, based on the depth estimation data generated by the program of claim 5 to which the non-3D image is supplied and the non-3D image to which depth information is neither included explicitly nor included implicitly like a stereo image; and outputting a pseudo 3D image wherein one of the non-3D image and the different viewpoint image is a left-eye image and the other is a right-eye image.

* * * * *